(12) United States Patent
Narayanaswami

(10) Patent No.: US 6,980,175 B1
(45) Date of Patent: Dec. 27, 2005

(54) PERSONAL SMART POINTING DEVICE

(75) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 09/607,800

(22) Filed: Jun. 30, 2000

(51) Int. Cl.$^7$ ................................................ G09G 5/00
(52) U.S. Cl. ..................... 345/2.3; 345/156; 715/737; 715/744; 715/748; 707/102; 707/202; 709/221; 709/246
(58) Field of Search ........................ 345/156, 2.1–2.3, 345/161–169, 172, 179, 733, 737, 744, 747, 345/748, 750, 753, 761, 811, 856, 864, 866; 455/556–559, 455/566; 707/102, 202, 204; 709/207, 212, 709/216, 221, 222, 230, 232, 237, 246, 301, 709/302

(56) References Cited

U.S. PATENT DOCUMENTS

| | | | |
|---|---|---|---|
| 5,638,530 A | * | 6/1997 | Pawate et al. .................. 710/13 |
| 5,854,621 A | * | 12/1998 | Junod et al. .................. 118/418 |
| 5,862,321 A | * | 1/1999 | Lamming et al. ........... 358/403 |
| 5,878,282 A | * | 3/1999 | Mital ........................... 235/492 |
| 6,256,019 B1 | * | 7/2001 | Allport ........................... 283/74 |
| 6,292,181 B1 | * | 9/2001 | Banerjee et al. ............. 345/179 |

OTHER PUBLICATIONS

"The World's Smallest PDA Computer Watch", Hammacher Schlemmer Mid Summer 2000 Catalog, p. 3.

* cited by examiner

*Primary Examiner*—Henry N. Tran
(74) *Attorney, Agent, or Firm*—Scully, Scott, Murphy & Presser; Richard Lau, Esq.

(57) ABSTRACT

A personal smart pointer device comprises a conventional computer mouse or like pointing device equipped with additional hardware and software for increased functionality. The personal smart pointer device readily connects with any computer and is provisioned with hardware and software for facilitating network computer-like applications, including enabling receipt and storage of information, and transfer of information to adjunct devices such as a PC, a mobile computer, and other pervasive devices such as a cellular phone and PDA. Information to be transferred includes those personal preferences, features and customizations of applications/programs used by the user on his/her own personal device, in order to facilitate use of the application/program on an adjunct device. The communication of personal preferences and customizations may be accomplished wirelessly.

28 Claims, 4 Drawing Sheets

PERSONAL SMART POINTING DEVICE

BACKGROUND OF THE INVENTION

Field of the Invention

This invention relates generally to computer display pointing devices such as a mouse, and more specifically, to a smart pointing device having intelligence for providing user interface customization when employed with other devices not owned by a user including PCs, personal digital assistants, cell phones, etc.

Discussion of the Prior Art

It is often difficult for a person to use another person's personal computing device (PCs) as another person's PC most likely possesses a different set of customizations and default options than the first person.

It would be highly desirable to provide a system for customizing a PC for a user that includes a portable device that would retain that user's set of preferences and customizations and that may be employed to transfer the preferences and customizations to the PC that can recognize the portable device. Such customizations may include shortcuts on the desktop, bookmarks for browsers, the browser history, icon settings for applications, encrypted passwords for web sites, etc.

It would further be highly desirable to provide a system for customizing a PDA and cell phone for a user that includes a portable device that would retain that user's set of preferences and customizations and that may be employed for transferring the preferences and customizations to any PDA and cell phone that can recognize the portable device. Such cell phone customizations may include a set of phone numbers that would personalize the cell phone. As known to skilled artisans, PDA customizations may include power management settings, list of active applications, wireless service provider, etc.

It would additionally be highly desirable to provide such a portable device that retains a user's set of preferences and device customizations with wireless communication capability such that it may wirelessly connect with a recipient device such as a PC, PDA, cell phone etc.

SUMMARY OF THE INVENTION

It is an object of the present invention to provide a device that enables customization of a PC for a user by retaining the user's set of personalized data including application preferences and customizations and which may be transferred to a visited device such as a PC, PDA, cell phone, etc.

According to the principles of the invention, there is provided a personal smart pointer device capable of interfacing with a computer device enabling a user to interface with an application executing on said computer device, said pointer device comprising: memory storage device for enabling storage of personalized user preferences relating to user customized aspects of a user application executing on a first computer device; a control mechanism for controlling transfer of said personalized user preferences from the first computer device to the memory storage device for storage therein when said pointer device is interfaced with said first computer device; and, a mechanism for interfacing with a second computing device, and in response to entering a same user application executing on said second computing device, said control mechanism further initiating transfer of said personalized user preferences from said memory storage device to said same application for altering said user application in accordance with said user customized aspects wherein the pointer device is transportable for transferring user customized aspects of many user applications of first computer devices to subsequent personalized use of same applications executing on said second computer devices.

Advantageously, the personal smart pointer device is able to retain original user application preferences currently existing in the second device prior to altering the user application with the user customized aspects and restore the user application preferences for the user application after disconnecting the pointer device from the second device.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

In a preferred embodiment of the invention, a conventional computer mouse or like pointing device is equipped with additional hardware and software for increased functionality. The mouse is a desirable form factor as it doubles as a pointing device and readily connects with any computer. More particularly, the "smart personal pointing" device, as now referred to herein, is provisioned with hardware and software for facilitating network computer-like applications, including enabling receipt and storage of information, and transfer of information to adjunct devices ("visited device(s)") such as a PC, a mobile computer, and other pervasive devices such as a cellular phone and PDA. Preferably, as will be explained, information to be transferred includes those personal preferences, features and customizations of applications/programs used by the user on his/her own personal device, in order to facilitate use of the application/program on a visited device, such as colleague's PC, a phone rented with a car, etc. As will be described herein, the communication of personal preferences and customizations may be accomplished wirelessly.

Figure 1:
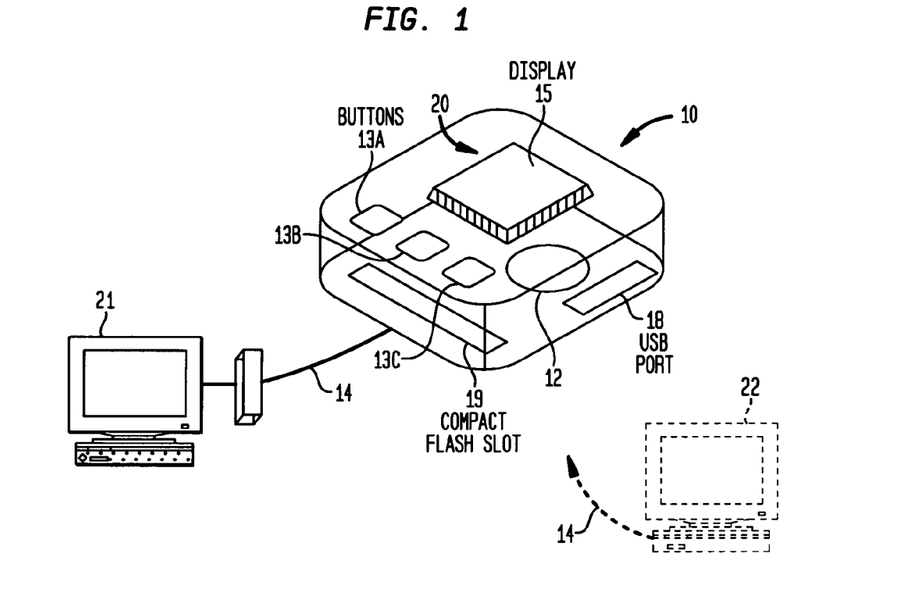
FIG. 1 illustrates conceptually a hardware block diagram depicting the smart personal pointer device of the invention.

FIG. 1 illustrates the smart personal pointing device 10 which comprises components of a typical computer mouse device such as a position tracking roller ball mechanism 12, one or more buttons 13a,b,c including at least the mouse left-click 13a selection and right-click 13c option buttons, and, an interface 14 for transmitting signals from the mouse device to an attached computer device 21. In the preferred embodiment, the smart personal pointing device 10 additionally includes hardware and software elements 20 including a CPU, a memory board including flash memory, and wireless communications devices, e.g., receiver, transmitter, for enabling wireless voice and data communications. One hardware element includes a high-resolution display 15 for presenting use information, e.g., icons that may indicate that the battery is low, or for some other status information. Additionally included is a universal serial bus (USB) interface device 18 for communicating data signals in accordance with the USB protocol, and, additional interfaces such as expansion Personal Computer Memory Card International Association (PCMCIA) slots 19 so that the user of the device may utilize PCMCIA cards in conjunction with that user's own device, or a visited device. The ability to add compact flash/PCMCIA slots enables additions of peripherals such as compact flash/PCMCIA cards for further flexibility, and additionally solves the problem of lack of PCMCIA slots in desktop machines. Thus for examples, if the personalization data will not fit into the flash memory provided on the memory board, the user may additionally put a microdrive (such as provided by IBM) into the compact flash slot 19 which provides storage of more than 340 MB of data. In an example use of the smart personal pointing device, user may plug his/her compact flash data card from his/her digital camera into the slot 19 and download digital pictures. As a further feature, the smart-mouse may be additionally provisioned with a wireless network card (not shown).

Figure 2:
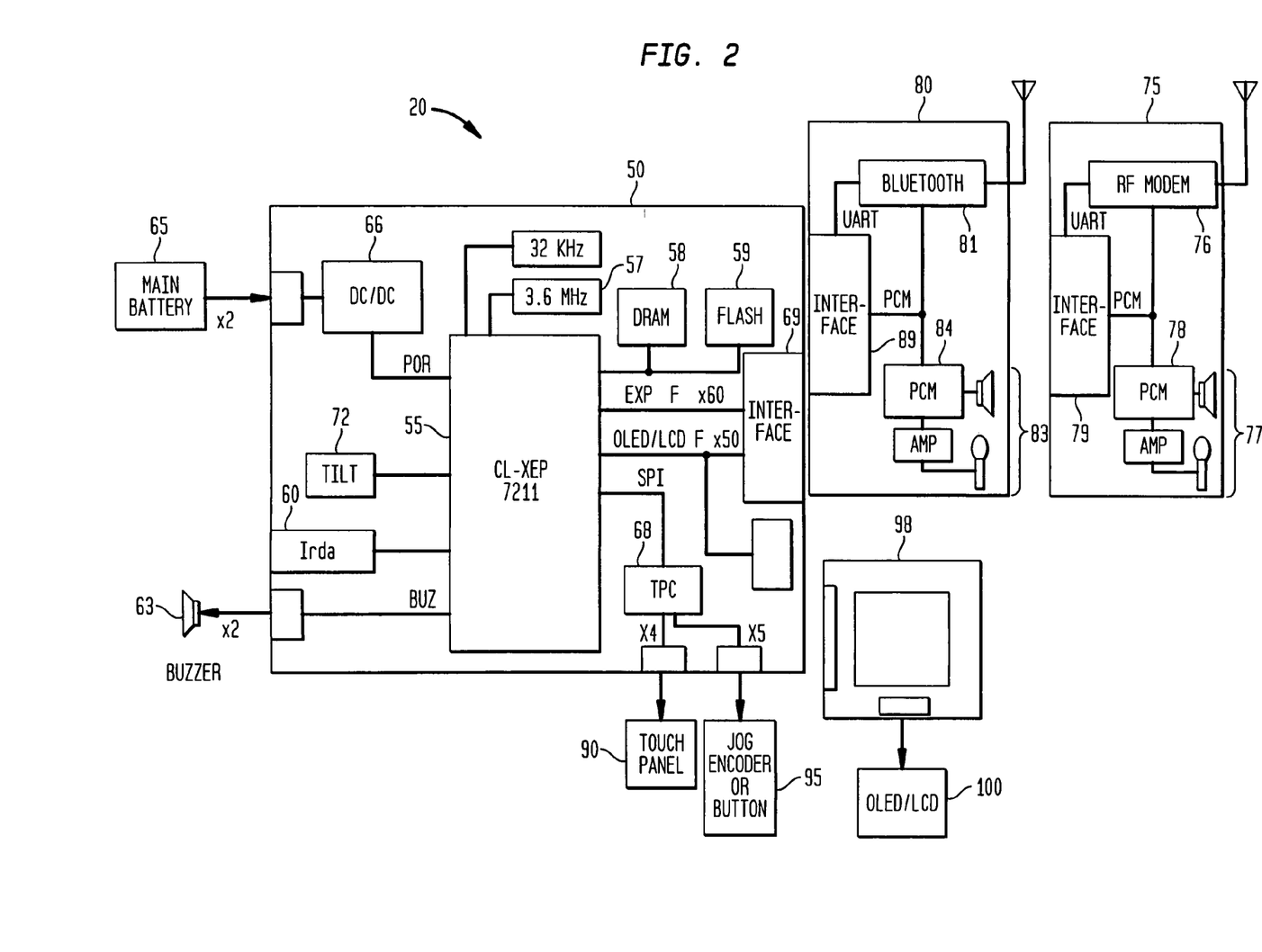
FIG. 2 is a detailed schematic illustrating the hardware architecture comprising the smart personal pointer device of the invention.

FIG. 2 is a detailed block diagram illustrating the hardware architecture for inclusion in the smart personal pointing or similar form factor pointing device 10. As shown in FIG. 2, a base card 20 includes a first or main card 50 housing the core processing unit, I/O, and memory. For example the main card 50 includes a CPU 55, such as a Cirrus Logic CL-EP211, which is a single-chip embedded controller functioning as a CPU for ultra-low-power applications, and armed with processing and enhanced memory management features to function equivalently as a 100 MHz Pentium. The core processing unit may operate at 2.5 V, and, to minimize the board size, may be equipped with a 3.68 MHz ceramic resonator 57 for generating the main frequency clock and timing signals. The main card 50 additionally includes sufficient nonvolatile and volatile memory including, for example, 64 Mbit EDO DRAM 58 and SRAM/Flash memory 59 that supports the system code. One communications subsystem for the personal pointing device 10 includes a line of sight Infrared Data Association (IrDA) communications interface having a low-power IR transceiver module 60 mounted on the card 50 for direct connection with interface decoder pins of the CPU 55 which includes an IrDA SIR protocol encoder. The first card 50 additionally includes various Analog to Digital converters (ADC), memory refresh logic and industry standard interfaces such as a compact flash interface for example, so that other devices could be attached to the Personal pointer device 10. Other interfaces such as Universal Serial bus (USB), and I2C, etc. may additionally be incorporated. FIG. 2 further illustrates the main card 50 as comprising power supply subsystem including a rechargeable Li-Polymer type battery 65 and a DC to DC converter 66 for supporting a wide dynamic range of Personal pointer system/sub-system load.

With further reference to FIG. 2, the main card 50 has no audio capability but is equipped with a PCM audio interface in expansion tabs (not shown) for an accessory card, i.e., either card 75 or 80, in the Personal pointer designs that support PCM audio. Particularly, the accessory card 75, 80 implemented includes a speaker and a microphone combination 77, 83 respectively, with the microphone functioning to record voice input which may be processed by the processor subsystem or stored in a storage subsystem for subsequent playback, and the speaker functioning to provide voice output, produce customized tones, and enable acoustic coupling with other listening devices, etc.

As shown in FIG. 2, each speaker/microphone combination 77. 83 is connected to a respective pulse-coded modulation PCM coder/encoder devices (CODECs) 78, 84 which are controlled by a respective PCM interface 79, 89 to the CPU 55. The accessory card 75, 80 is additionally equipped with various communications subsystem including low power and intermediary power radio frequency communications devices that support a Wireless Application Protocol ("WAP") used to provide communications links to mobile computers, mobile phones, portable handheld devices and, connectivity to the Internet. In one embodiment, the specific communications subsystem include circuitry for supporting BlueTooth 81 or like small-factor, low-cost radio solution circuitry, e.g., an RF-modem 76, and may include other lower power radio and Flex-paging communications circuits (not shown), etc. For instance, as shown in FIG. 2, the auxiliary communication card 80 implements the BlueTooth industry standard for Radio Frequency (RF) communication, however, it is understood that other standards such as IEEE 802.11 or other RF protocols may be implemented as well. Moreover, portions of these communication protocols may be implemented on the processor on the main board 50 so that the total number of the components required is minimized. The CPU system on the main card 50 preferably employs a first Universal Asynchronous Receiver Transmitter (UART1) device (not shown) for supporting either the RF-modem 76 or Bluetooth 81 communications functionality and, may be equipped with a second UART device (UART2) providing support for data download functionality, e.g., from a PC or network server. It is understood that any like data transfer mechanism or data exchange interface device may be implemented to provide data download and RF communications support functionality.

For purposes of interacting with the device, the Personal pointer system 10 is provided with a touch sensitive screen/panel 90, and also a roller wheel mechanism, i.e., jog encoder 95. The touch sensitive screen enables the direct launching of applications by physical user entry of a graffiti "squiggle" in the manner such as described in commonly-owned co-pending U.S. patent application No. 09/607,596 entitled GRAFFITI BASED APPLICATION LAUNCH ON A SMART WATCH, the whole contents and disclosure of which is incorporated by reference as if fully set forth herein, and may initiate other applications/actions/events by physical touching of certain Personal pointer display areas. In one embodiment, the touch sensitive screen panel is provided with a four (4) position touch screen. For instance, forward and back navigation for Personal pointer display is enabled by physically touching certain areas of the touch sensitive panel. The roller wheel mechanism 95 may be rolled up or down (i.e., clockwise and anticlockwise) to simulate a display cursor scrolling function for text and graphics, and specifically generates signals that are A/D converted for receipt by the processor to enable movement of the Personal pointer device display cursor, and more particularly, movement of an arrow cursor or other displayed indicators providing appointment update and browsing functions.

As further shown in FIG. 2, various Analog to Digital converters (ADC) 68 support an interface with the touch screen display panel 90, and an interface with the jog encoder or button for the roller wheel mechanism 95. An interface 69 is provided for a unit 98 housing a high resolution (VGA equivalent) emissive Organic Light Emitting Diode (OLED) high contrast display 100. Further, the main card 50 for the basic shell interfaces to a buzzer 63 controlled directly by the CPU 55 using its buzzer interface and timer counters. To detect the posture of the personal pointing device, a mechanical four-way tilt sensor 72 is further provided comprising mechanical switches (for detecting degree of tilt) producing signals which may be detected by the CPU. This sensor may be used for the various purposes such as power management, display control, etc. In a preferred embodiment, additional sensors may be attached to the Personal pointer device over an interface.

With more particularity, the high contrast display 100 of FIG. 2 does not need a backlight to make the display visible. Thus, the power consumed by the display is proportional to the number of pixels that are turned on in the display. Since the pixels preferably comprise light emitting diodes, the display is automatically visible at night and a user does not need to press any buttons to see the display. Moreover, the OLED display 100 may be viewed clearly at a wide variety of angles with the brightness of these displays being controlled by limiting the amount of current supplied to the diodes. In one embodiment, the OLED chip 100 is a high-resolution pixel addressable display, e.g., 640×480, for enabling the display of various textual and graphical items, similar to what may be displayed on a computer screen or a Palm Pilot®. Example displays may include icons indicating usage status for example, or display of text indicating location and context of the smart personal pointing device usage.

Figure 3:
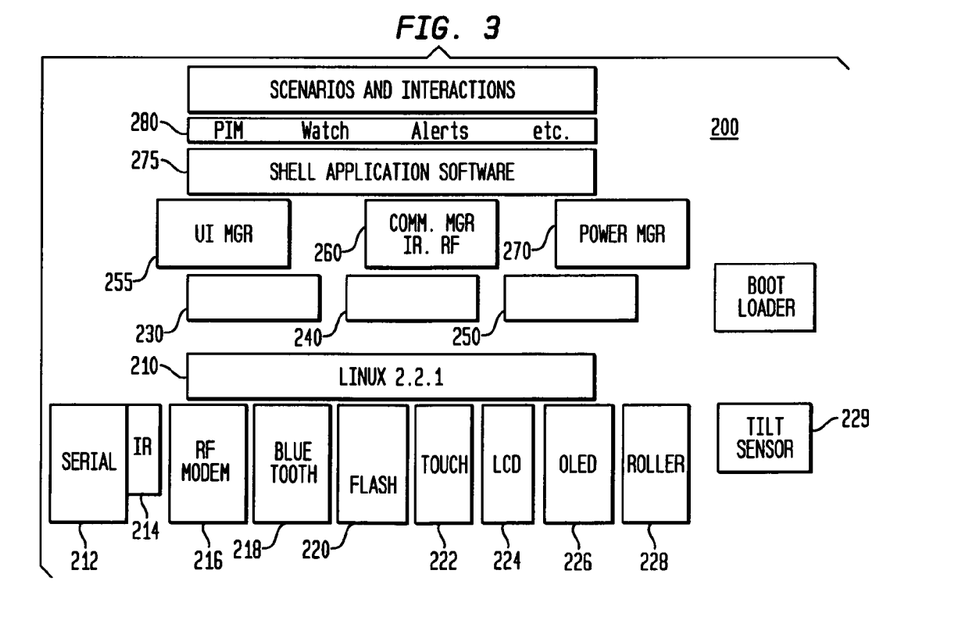
FIG. 3 illustrates the software architecture implemented for the smart personal pointer device of the invention.

FIG. 3 illustrates the software architecture 200 for the Personal pointer device 10. At its lowest level, the Personal pointer system runs an operating system 210, e.g., LINUX 2.2.1, that permits multiple user level and kernel level threads to run and will support multitasking and multi-user support. Device drivers are provided for each input/output subsystem will handle low level device dependent code and interfaces so that higher level Application Programming Interfaces (APIs) can be implemented on top of them. The device drivers provided for each input/output subsystem include a serial I/O system driver 212, IrDA system driver 214, RF-Modem subsystem driver 216, Bluetooth system driver 218, flash memory 220, touch screen subsystem driver 222, LCD subsystem driver 224, OLED subsystem driver 226, roller wheel subsystem driver 228 and tilt sensor device driver 229. A client-server graphics subsystem 230, storage subsystem manager 240 and synchronization subsystem manager 250 is provided on top of the device drivers for receiving and transmitting I/O events between the applications, updating of the screen, etc. A graphics library is available for the application writer so that custom screens may be displayed. A user interface manager 255 is provided to process events received from user input devices such as the roller wheel, bezel (i.e., jog encoder) and touch panel for the appropriate applications. A communication subsystem manager 260 is provided to handle events from communications channels and pass the events to the right application to set things up for data transfers to proceed. In accordance with the principles of the invention, the synchronization manager 250 is provided to synchronize data transfer between the Personal pointer device and the other devices. Particularly, it receives the data from the communication channel and operates in conjunction with the right application to decode the sent data and update the data for the application receiving the data. An example of this would be an update to a calendar event. A system wide power manager 270 is provided to monitor and control power consumption on the device and communicate with other subsystems such as the operating system scheduler to optimize the battery life of the device. The power manager 270, for example, measures the power left in the battery, estimates the power required to run an application, and recommends what subsystems need to be shut down as the battery starts draining out.

As further shown in FIG. 3, the Personal pointer device 10 is equipped with application software 275 provided on top of the basic graphics, communication and synchronization subsystems. One key application supported is the microbrowser which enables access to a WAP-supporting Web site and receives Web-based communications written in, for example, the Wireless Markup Language ("WML") using the XML standard. WML particularly is designed to optimize Internet text data for delivery over limited-bandwidth wireless networks and onto small device screens, and particularly, is devised to support navigation with limited input mechanisms, e.g., buttons. Details regarding the implementation of WML in a Wrist Watch device may be found in commonly-owned, co-pending U.S. patent application No. 09/608,042 entitled SYSTEM AND METHOD EMPLOYING WML ANNOTATIONS FOR USER INTERFACE CONTROL OF A WEARABLE APPLIANCE the contents and disclosure of which is incorporated by reference as if fully set forth herein. Other supported applications include Personal Information Management (PIM) applications software 280.

In accordance with the principles of the invention, the user device from which data is to be transferred is provided with software executable as part of a control mechanism for initiating transfer of selected personalized data such as preferences and customizations associated with the user, i.e., from the user device e.g., that user=s personal Windows7 desktop to the personal pointer device. In an alternate embodiment, a user may initiate the transfer from the personal pointer device itself. For example, a user may have set some preferences in Microsoft Power-point, or even a Netscape browser, and even may have specially created icons which are sorted to the user's smart mouse for subsequent transmission to another device when the user does not have access to his/her own PC. This may be accomplished by a wireless communication or cabling 14 via the smart mouse port of the user device. Other types of personalization data may include profile information such as desktop profile (list of applications on the main desktop), screen resolutions, screen savers, menus on start button, preferred settings for various applications, browser bookmarks, history of web sites visited, history of files last viewed, registry settings, passwords for various web sites and applications used by the owner. Furthermore, a personalized menu such as the bar of icons used for Freelance Graphics, Powerpoint, and related preferred settings such as font, document style, and dictionaries, may also be communicated to the smart personal pointing device for storage and subsequent transmission according to the invention. Preferably, these preferences are all stored in preference files in the device memory corresponding to a particular application. It is understood that other personalized preferences like click speeds and mouse (tracking ball) rolling rates may additionally be stored in preference files for implementation in the visited devices. Furthermore, a microdrive may obviously be used store other items such as traditional files, presentations, images, etc.

Via the system display 300 on the personal smart pointer device, a main menu comprising selectable icons for launching applications may be chosen. Alternately, as application may launched by a graffiti squiggle via the touch screen panel. One icon selection (not shown) would enable launch of an application for transmitting the personalized data including preferences and customizations, e.g., that user's personal Windows® desktop, to the desktop of a visited device 22, i.e., another person's PC. This may be accomplished by a wireless communication or via a smart mouse port of the visited device 22. In an alternate embodiment, a user may initiate the transfer of data from the personal pointer device 10 to the visited device 22 from the personal pointer device itself. Thus, in one example, when interacting with visited devices 22 such as phones and PDAs, data such as address books, power management options, etc., may be transferred to the particular device to personalize them. In the preferred embodiment, the personal pointer device 10 maintains the notion of the current application that the user has access to or is executing on the visited PC 22, and thus, knows which icons or preferences to transfer for that particular application and is able to perform the transfer on demand. That is, some applications like Lotus Notes, Lotus Freelance Graphics, Microsoft Power Point, Netscape Navigator, etc., allow the user to build custom icons in the menu area of the screen, e.g., below the File Edit View menus. For example, in Netscape Navigator a special icon on the menu bar may take the user to a specific web site instead of having to type the URL for the web site. Thus, the icon list may be transmitted to the smart point and, the list of icons for a particular application may change utilizing the icon list received from the smart pointer 10. Thus, if multiple versions of applications exist such as Office 97, Offices 2000, etc., the smart pointer holds data specific to each version. In accordance with the transfer mechanism, when the user disconnects from the visited device, e.g., PC, all traces of the user's personalization are removed from the PC 22 so that the integrity of the person's data is preserved. That is, appropriate application software is provided to remove the user's preferences once that user disconnects the device from the visited PC. Thus, preferences associated with the original (visited) PC will not get corrupted.

Figure 4A:
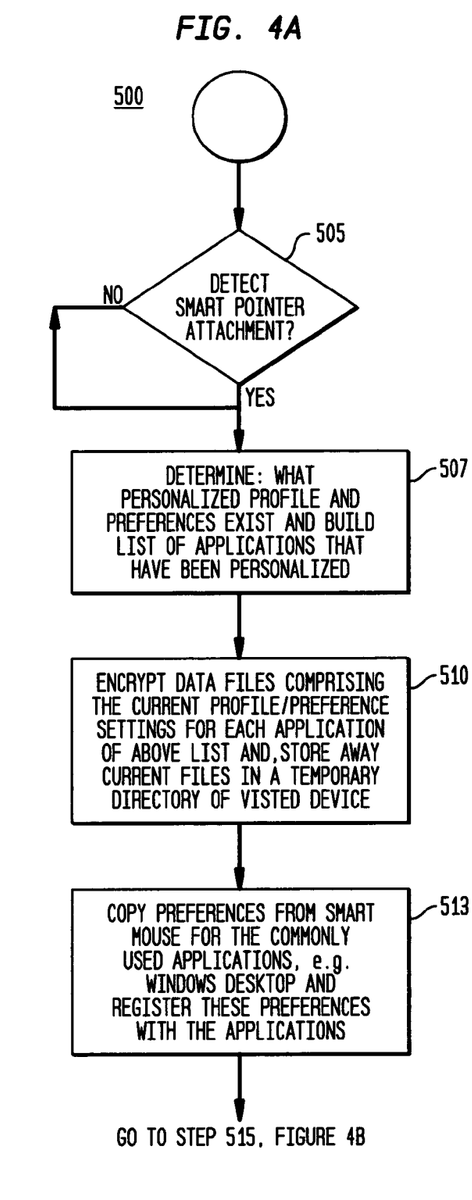
FIGS. 4(a)–4(c) are flow charts illustrating the method for transferring preferences between devices in accordance with the present invention.
Figure 4B:
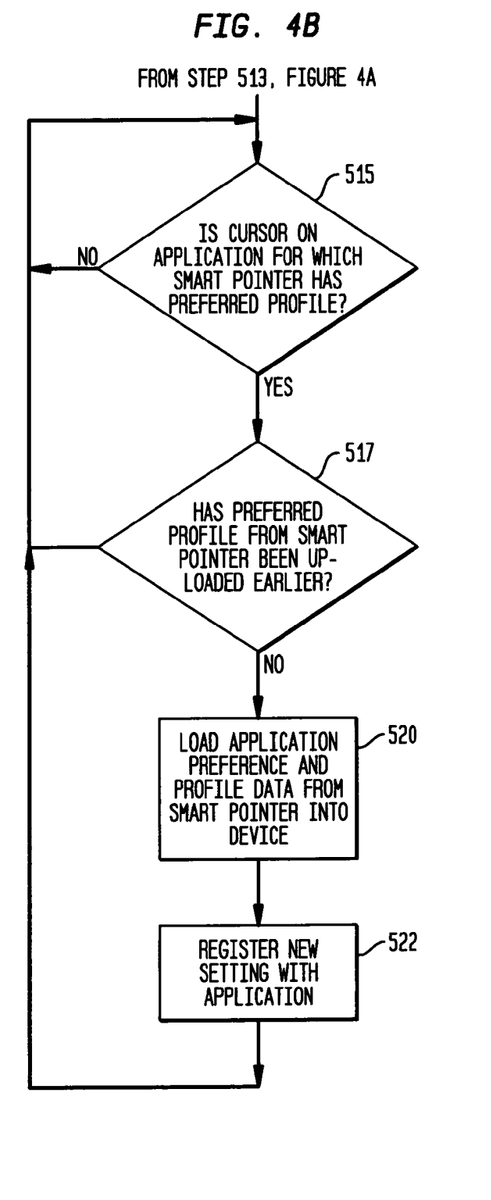
Figure 4C:
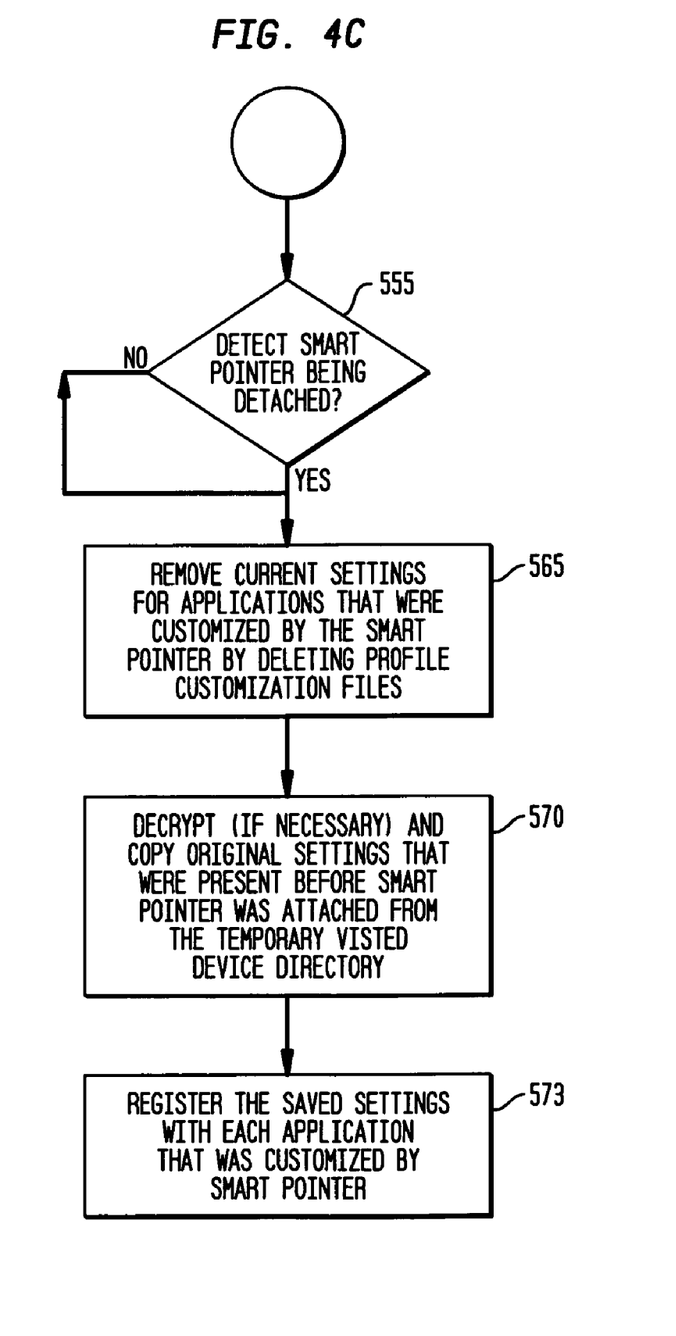

With greater specificity, FIGS. 4(a)–4(c) illustrate the method 500 for transferring preferences between devices in accordance with the present invention. As shown in FIG. 4(a), a first step 505 is to detect the attachment of a personal pointer device with the visited device, e.g., a PC, by a process executing on the visited device. Once attachment of a smart mouse is detected, at step 507, a determination is made as to whether the personal pointer device mouse includes any personalized profile and preferences, and, if they exist, the step of building a list of applications that have been personalized. Then, at step 510, for each application determined at step 507, the process stores away the current settings in a temporary directory located in the visited device, with the optional step of encrypting the data files. Next, the step 513, the process includes copying the preferences from the smart mouse for the commonly used applications such as Windows® desktop, and registering these preferences with the applications. Continuing to step 515, FIG. 4(b), a determination is made as to whether the smart personal pointer device cursor is on the application for which the smart pointer has a preferred profile. If the smart mouse pointer cursor is on the application for which the smart pointer has a preferred profile then, the process continues to step 517 which comprises the step of determining whether the preferred profile has been previously uploaded from the smart pointer. If the preferred profile has been previously uploaded from the smart mouse pointer, then the process returns to step 515; otherwise, the process continues to step 520 where preference and profile data for that application is loaded from the smart pointer into the device. Finally, at step 522, the new settings are registered with the application. The process for restoring preferences on the visited device is performed in accordance with FIG. 4(c). As illustrated in FIG. 4(c), a first step 555 is to detect the detachment of the smart personal pointing device with the visited device, e.g., a PC. Once detached, at step 565, the current settings for the applications that were customized by the smart pointer are removed by deleting the profile customization files. Then, at step 570, the original settings that were present before the smart pointer was attached are decrypted (i.e., if previously encrypted) and re-copied to the respective application with these settings then being registered for each application that had been modified as indicated at step 573.

With further regard to the transfer application, the smart personalized pointer device is additionally provided with a mechanism by which the application on which a display cursor is presently located exchanges information with the smart mouse on a regular basis so as to enhance the user experience. Such data may include information about when the user last used the application, in what room the smart mouse is located, what the ambient room temperature and pressure is, etc., This will enable applications to be context and location aware. Thus, the smart personal pointer device is equipped to gather a lot of input from sensors around it and send it to the applications which can then use that data and adapt to it. The smart personal pointer device will be able to gather such data from all the environments it visits, hallways, conference rooms, etc.

By using a personalized smart mouse, the user is thus provided with a more personal experience with any standard computer or device, not just the computer at his desk. By keeping personal profile data in the personalized mouse the data such as passwords, etc., may be kept more securely. In accordance with a preferred embodiment, the smart personal pointer device is equipped with a password protection mechanism, such as that described in commonly-owned co-pending U.S. patent application No. 09/608,110 entitled PASSWORD PROTECTION USING SPATIAL AND TEMPORAL VARIATION IN A HIGH-RESOLUTION TOUCH SENSITIVE DISPLAY, the whole contents and disclosure of which is incorporated by reference as if fully set forth herein, in order to render the mouse useless for anyone other than the owner.

While the invention has been particularly shown and described with respect to illustrative and performed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A personal smart device capable of interfacing with a first computer device for interacting with an application executing on said first computer device, said personal smart device comprising:
   a memory storage device for enabling storage of interface settings data for configuring an interface of an application executing on said first computing device, said interface settings data of an application having been customized at said first computing device according to a user preference;
   a mechanism for receiving said interface settings data from said first computing device for storage in said memory storage device when said personal smart device is interfaced with said first computing device; and, a mechanism for communicating said stored customized interface settings data from said memory storage device for registration with a same user application executing on a second computing device for altering said user interface for said application in accordance with said user customized interface settings data, wherein said personal smart device is transportable for transferring user customized application interface settings of many users applications of a first computer device for subsequent personalized use of same applications executing on second computing devices.

2. The personal smart device as claimed in claim 1, wherein said second computing device retains original user application interface settings data currently existing in said second computing device prior to altering said user application with said user customized application interface settings data, and restores said original user application interface settings data preferences for said user application after disconnecting said personal smart device from said second computing device.

3. The personal smart device as claimed in claim 1, wherein said customized interface settings data of user applications are stored in associated preference files in said memory storage device.

4. The personal smart device as claimed in claim 1, wherein said communication mechanism implements a universal bus (USB) communications protocol.

5. The personal smart device as claimed in claim 1, wherein said communication mechanism transfers signals including said interface settings data according to a wireless communications protocol.

6. The personal smart devices as claimed in claim 5, wherein said wireless communications protocol includes a BlueTooth radio frequency (RF) communications standard.

7. The personal smart device as claimed in claim 5, wherein said wireless communications protocol includes an IEEE 802.11 communications standard.

8. The personal smart device as claimed in claim 1, wherein said user application interface settings data comprises a user profile of applications adapted for display via a computing device display interface.

9. The personal smart device as claimed in claim 1, wherein said user application interface settings data comprises one or more selected from the group comprising: screen resolution data, screen saver application, menu choices, preferred settings such as font, document style, and dictionaries for various applications, browser bookmarks, history of web sites visited, history of files last viewed, registry settings, and, a bar of icons personalized for applications.

10. The personal smart device as claimed in claim 1, further comprising a touch-sensitive panel interface responsive to use entry comprising one or more graffiti characters each representing an application to be launched in said personal smart pointer device.

11. The personal smart device as claimed in claim 1, further comprising password protection mechanism for enabling user to use said pointer device.

12. The personal smart device as claimed in claim 1, wherein a first and second computing device comprises one of: a personal computer, a personal digital assistant, a cellular phone, and a network device.

13. The personal smart device as claimed in claim 1, further comprising means for recognizing a like application being executed on said second computing device and automatically initiates said communication of customized interface settings data thereto.

14. A method for customizing application interface settings in computing devices via a personal smart device, said method comprising:
   a) inputting interface settings data for configuring an interface of an application executing in a first computing device to said personal smart device, said interface settings data of an application having been customized at said first computing device according to a user preference;
   b) storing said customized interface settings data in a memory storage device provided in said personal smart device;
   c) subsequently transferring said stored customized application interface settings data for registration with a like user application executing in a second computing device; and,
   d) altering said user interface for said like user application executing in said second computing device in accordance with said customized application interface settings data, wherein said personal smart device is transportable for transferring user customized application interface settings data of many user applications of first computing devices to facilitate use of like applications in second computing devices.

15. The method as claimed in claim 14, wherein said user application interface settings data comprises a user profile of applications adapted for display via a computing device display interface.

16. The method as claimed in claim 14, wherein said user application interface settings data comprises one or more selected from the group comprising: screen resolution data, screen saver application, menu choices, preferred settings such as font, document style, and dictionaries for various applications, browser bookmarks, history of web sites visited, history of files last viewed, registry settings, and, a bar of icons personalized for applications.

17. The method as claimed in claim 14, wherein prior to step d), the step of retaining original user application interface settings data currently existing in said second computing device.

18. The method as claimed in claim 17, wherein after use of said like application on said second device by said user, the step of: restoring said original user application interface settings data for said like application on said second computing device after disconnecting said smart personal device from said second computing device.

19. The method as claimed in claim 14, wherein said receiving step a) and transferring step d) is accomplished in accordance with a wireless communications protocol.

20. The method as claimed in claim 14, wherein a first and second computing device comprises one of: a personal computer, a personal digital assistant, a cellular phone, and a network device.

21. The method as claimed in claim 14, wherein said transferring step c) further comprises the step of: recognizing a like application being executed on said second computing device and automatically initiating said transfer of personalized user preferences.

22. A program storage device readable by a machine, tangibly embodying a program of instructions executable by the machine to perform method steps for customizing application interface settings executing in computing devices, said method steps including the steps of:
   a) inputting interface settings data for configuring an interface of an application executing in a first computing device to personal smart device, said interface settings data of an application having been customized at said first computing device according to a user preference;

b) storing said customized interface settings data in a memory storage device provided in a personal smart device;

c) subsequently transferring said stored customized application interface settings data for registration with a like user application executing in a second computing device; and, d) altering said user interface for said like user application executing in said second computing device in accordance with said customized application interface settings data, wherein said personal smart device is transportable for transferring user customized interface settings data of many user applications of first computing devices to facilitate use of like applications in second computing devices.

23. The program storage device readable by a machine as claimed in claim 22, wherein prior to step d), the step of retaining original user application interface settings data currently existing in said second computing device.

24. The program storage device readable by a machine as claimed in claim 23, wherein after use of said like application on said second computing device by said user, the step of: restoring said original user application interface settings data for said like application on said second computing device after disconnecting said personal smart device from said second computing device.

25. The program storage device readable by a machine as claimed in claim 22, wherein said receiving step a) and transferring step d) is accomplished in accordance with a wireless communications protocol.

26. The program storage device readable by a machine as claimed in claim 22, wherein a first and second computing device comprises one of: a personal computer, a personal digital assistant, a cellular phone, and a network device.

27. The program storage device readable by a machine as claimed in claim 22, wherein said transferring step c) further comprises the step of: recognizing a like application being executed on said second device and automatically initiating said transfer of personalized user preferences.

28. An apparatus for customizing a first computing device with application interface settings customized for an application executing in a second computing device, said apparatus comprising:

a portable device adapted to interface with said second computing device for receiving therefrom application interface settings data for configuring an interface of an application executing on said second computing device, said interface settings data of an application having been customized according to a user preference, said portable device including a memory storage means for storing said interface settings data;

means for automatically communicating said interface settings data from said memory storage means of said portable device for registration with a same user application executing on said first computing device for formatting said interface of said same user application interface on said first computing device in accordance with said user customized interface settings data, wherein a user interfaces with an application executing on any computing device in a manner which they are accustomed.

* * * * *